United States Patent [19]

De Wied et al.

[11] 3,862,928
[45]

[54] PSYCHOPHARMACOLOGICAL HEXA-PEPTIDES CONTAINING A D-PHENYLALANYL RESIDUE

[75] Inventors: David De Wied, Bilthoven; Hendrik Marie Greven, Heesch, both of Netherlands

[73] Assignee: Akzona Incorporated, Ashville, N.C.

[22] Filed: Aug. 28, 1972

[21] Appl. No.: 284,083

Related U.S. Application Data

[63] Continuation-in-part of Ser. No. 840,518, July 9, 1969, abandoned.

[52] U.S. Cl. ............................. 260/112.5, 424/179
[51] Int. Cl... C07c 103/52, C07g 7/00, A61k 17/06
[58] Field of Search .................. 260/112.5; 424/179

[56] References Cited
UNITED STATES PATENTS

| | | | |
|---|---|---|---|
| 3,228,926 | 1/1966 | Kappeler et al. | 260/112.5 |
| 3,228,927 | 1/1966 | Kappeler et al. | 260/112.5 |
| 3,345,354 | 10/1967 | Kappeler et al. | 260/112.5 |
| 3,388,112 | 6/1968 | Geiger et al. | 260/112.5 |
| 3,479,333 | 11/1969 | Greven | 260/112.5 |
| 3,632,743 | 1/1972 | Geller et al. | 260/112.5 |

OTHER PUBLICATIONS

Greven et al.: Eur. J. Pharmacol., 2, 14–16 (1967).
Otsuka et al.: Bull. Chem. Soc. Jap., 37, 289–90 (1964).
DeWied et al.: "Endocrinology and Human Behavior," Oxford U. Press, London (1968), pp. 188–199.
Yajima et al.: Chem. Pharm. Bull, 15, 504–10 (1967).

Primary Examiner—Lewis Gotts
Assistant Examiner—Reginald J. Suyat
Attorney, Agent, or Firm—Hugo E. Weisberger

[57] ABSTRACT

The invention relates to novel peptides of the formula:

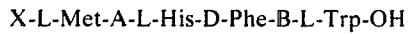

in which
A is selected from L-Glu and L-Gln,
B is selected from L-Arg and L-Lys and
X is selected from hydrogen, H-L-Ser and H-Gly, as well as derivatives thereof.

These peptides or derivatives thereof show valuable psychopharmacological activities.

4 Claims, No Drawings

PSYCHOPHARMACOLOGICAL HEXA-PEPTIDES CONTAINING A D-PHENYLALANYL RESIDUE

CROSS REFERENCE TO RELATED APPLICATION

This application is a continuation-in-part of application, Ser. No. 840,518, filed on July 9, 1969, now abandoned.

BACKGROUND OF THE INVENTION

From Science 153, 318 (1966) it is known that the decapeptide H-L-Ser-L-Tyr-L-Ser-L-Met-L-Glu-L-His-D-Phe-L-Arg-L-Trp-Gly-OH accelerates the extinction of the avoidance response. The latter peptide is the only ACTH-related peptide known so far, of which this facilitative effect on conditioned avoidance response has been described.

In contrast thereto may ACTH peptide fragments containing L-Phe instead of D-Phe, show an inhibition of extinction of the conditioned avoidance response, such as the (1–10)-ACTH peptide and the (4–10)-ACTH peptide. There is, however, no direct relationship between peptides exerting an acceleration of extinction and peptides having an inhibition of extinction, as may be concluded from the article in Science, previously cited.

SUMMARY OF THE INVENTION

Surprisingly it has now been found that much smaller peptides with the general formula:

X-L-Met-A-L-His-D-Phe-B-L-Trp-OH

in which
A is selected from L-Glu and L-Gln,
B is selected from L-Arg and L-Lys and
X is selected from hydrogen, H-L-Ser and H-Gly,
as well as derivatives of these peptides, selected from a pharmaceutically acceptable acid addition salt, a C-terminal unsubstituted amide, a C-terminal alkyl-substituted amide, the alkyl group of which contains 1–6 carbon atoms, a C-terminal ester derived from an aliphatic or araliphatic alcohol, the (ar)alkyl group of which contains 1–18 carbon atoms and a complex of metals selected from the group consisting of zinc, nickel, cobalt, copper and iron, have at least the same activity, as compared with the known D-Phe-decapeptide, mentioned above, on administration of the same dosage.

Especially for economic reasons the present peptides are thus to be preferred.

The peptides of the above general formula and the above defined derivatives thereof have valuable psychopharmacological activities. More particularly they accelerate the extinction of the conditioned avoidance response, which means that they can be used as tranquilizing agents or can be used for the treatment of certain mental disorders, whereby an accelerated extinction of a faulty behaviour-pattern (neurosis) is desired.

As indicated in the above general formula the amino acid glutamine instead of glutamic acid may be used in the synthesis of the above peptides. Of course it is also possible to obtain the same result by converting the (side chain) carboxyl group of the glutamic acid-residue into an amide group in the synthesis of the present peptides.

The amino acid arginine can be replaced, as indicated by lysine, without the activity of the peptides being changed. This modification is preferred from a point of view of an easier synthesis.

The new peptides can be prepared by means of the conventional methods adopted in the manufacture of the known peptides. For this purpose the amino acids are provided with protecting groups in appropriate places and coupled in the correct order, or smaller peptides are combined to bigger units. After the synthesis the protecting groups, present in the peptide molecule, are removed in a conventional manner, after which, if desired, the resulting peptide can be converted into a salt, derivative or complex.

Peptides are usually prepared by:
a. condensating an amino acid or peptide having a protected α-amino group and an activated terminal carboxyl group with an amino acid or peptide the α-amino group of which is free;
b. condensating an amino acid or peptide having an activated α-amino group and a protected carboxyl group with an amino acid or peptide having a free terminal carboxyl group and a protected α-amino group;
c. condensating an amino acid or peptide having a free carboxyl and a protected α-amino group with an amino acid or peptide having a free α-amino group and a protected carboxyl group.

Activation of the carboxyl group can take place, for example, by converting the carboxyl group into an acid halide, an azide, anhydride or imidazolide, or into an activated ester such as the cyanomethyl ester or p-nitro-phenyl ester.

The amino group can be activated by, for example, converting the amino group into a phosphate amide.

The most conventional methods for the condensation of amino acids or peptides are: The carbodiimide method, the azide method, the anhydride method and the method of the activated esters, described in, for example, "THE PEPTIDES", Volume I, 1965 (Academic Press) by E. Schröder and K. Lübke. Furthermore the so-called "solid phase" method of Merrifield, described in J. Am. Chem. Soc. 85, 2149 (1963), can be used for the manufacture of the present peptides.

The free functional groups in the amino acid or peptide, which should not participate in the condensation reaction, are protected effectively by the so-called protecting groups, which can be removed again quite easily by hydrolysis or reduction. Thus, for example, the carboxyl group can be protected effectively by, for example, esterification with methanol, ethanol, tertiary butanol, benzyl alcohol or p-nitrobenzyl alcohol or by forming an amide. The latter group, however, is very difficult to remove so that it is to be preferred to use it only to protect the terminal hydroxyl group in the ultimate peptide, viz. the carboxyl group of tryptophan. The N-protecting groups are generally acid groups, for example, an acid group derived from an aliphatic, aromatic, araliphatic or heterocyclic acid such as acetic acid, chloro-acetic acid, butyric acid, benzoic acid, phenyl-acetic acid, pyridine-carboxylic acid, or an acid group derived from carbonic acid such as ethoxy-carbonyl, benzyloxy-carbonyl, t-butyloxy-carbonyl or p-methyloxy benzyloxy-carbonyl, or an acid derived from an sulphonic acid such as benzenesulfonyl or p-toluene-sulfonyl, but other groups, too, can be used, such as substituted or unsubstituted aryl or aralkyl groups, for example, benzyl and triphenyl methyl.

The guanidine group of arginine should preferably be protected by a nitro group, while the imino group of histidine should preferably be protected by a benzyl or trityl group. Generally it is preferred to use a tertiary butylester to protect the carboxyl group and a butyloxy-carbonyl or benzyloxy-carbonyl group or a tosyl group to protect the amino group.

The protecting groups can be splitt off by various conventional methods dependent upon the nature of the relative group, for example, by means of trifluoroacetic acid or by mild reduction, for example with hydrogen and a catalyst such as, palladium, or with HBr in glacial acetic acid.

By derivatives of the present peptides are meant:

1. acid addition salts of the peptides according to the above formula I, derived from pharmaceutically acceptable acids, such as HCl, $H_3PO_4$, acetic acid, phenylpropionic acid, maleic acid, tartaric acid and citric acid.

2. C-terminal amides, both unsubstituted or alkyl-substituted amides, the alkyl group of which contains 1–6 carbon atoms, such as a C-terminal—$NH_2$ group, a —$NHCH_3$, —$N(CH_3)_2$ or —$N(C_2H_5)_2$ moiety.

3. C-terminal esters, derived from aliphatic or araliphatic alcohols containing from 1 to 18 carbon atoms, such as esters derived from methanol, ethanol, propanol and amylalcohol. Longer esters, however, containing from 8–18 carbon atoms are to be preferred because of their prolonged activity, such as esters derived from phenylpropylalcohol, phenylbutylalcohol, octylalcohol, undecylalcohol, hexadecylalcohol, octadecylalcohol and oleylalcohol.

4. metal complexes of the present peptides or peptide-derivatives with zinc, cobalt, nickel, copper and iron.

metal complexes, having a prolonged activity, are especially preferred. These metal complexes can be obtained by combining the peptides with sparingly soluble biologically suitable metal salts. metal hydroxides or metal oxides. As sparingly soluble metal salts the metal phosphates, metal pyrophosphates and metal polyphosphates are generally used.

Metals which can be used for this purpose are metals belonging to the b-groups of the periodic system, viz., cobalt, nickel, copper, iron, and preferably zinc. The preparation of said metal complexes takes place in a conventional manner.

For example, the metal complexes can be obtained by adding the peptide and a poorly soluble metal salt, metalhydroxide or metaloxide to an aqueous medium. The metal complex can also be obtained by adding an alkaline medium to an aqueous solution of the peptide and a soluble metal salt, by which the insoluble peptide-metalhydroxide complex is formed. The metal complex can further be obtained by adding the peptide, a soluble metal salt and a soluble salt to an aqueous, preferably alkaline, medium, by which the insoluble peptide-metal salt complex is formed in situ.

The complex can be used directly as a suspension or it can be isolated from the aqueous medium and resuspended afterwards for the preparation of an injectable composition.

The peptides according to the invention can be administered both orally and parenterally. Preferably the peptides are applied in the form of an injection preparation, for which purpose they are dissolved, suspended or emulsified in a suitable liquid. Mixed with suitable auxiliaries the peptides can also be made up in a form suitable for oral administration, such as tablets, pills and the like. The present peptides can further be administered in the form of suppositories or sprays.

The peptides according to the invention are preferably administered as injection-preparation in a daily dosage of from 0.01 mg of 10 mg per kg bodyweight. For oral administration, for suppositories and sprays the daily dosage may usually be somewhat higher, preferably from 1–10 mg per kg bodyweight.

The above dosage ranges are meant for the administration of the "free" peptides. As to the administration of the peptide derivatives and metal complexes, having a higher molecular weight, such as dosage is chosen that it corresponds to the above dosages for the "free" peptides.

The extinction of conditioned avoidance response has been determined in the so-called "shuttle box test". This test is a well-known test for measuring the antaractic (neuroleptic, tranquilizing activity, see for example R. A. Turner, Screening Methods in Pharmacology, Academic Press, New York 1965, page 94.

Reference is further made for example to the article of Kamano and Arp in Psychopharmacologia 6, 112 (1964), in which the effect of librium, a well-known tranquilizing agent, on avoidance response acquisition and its extinction has been described. It appears clearly that librium is responsible for an accelerated extinction of the conditioned avoidance response.

The method for measuring the extinction of conditioned avoidance response is as follows:

Male white rats weighing between 140–160 g were conditioned in the so-called shuttle box. The conditioned stimulus (CS) was a buzzer presented for 5 seconds. The unconditioned stimulus (US) was an electric shock applied through the grid floor of the box to the feet of the animal till it has made the response. Every day the conditioning trials were given with an intertrial interval averaging 60 seconds till the animal had reached the conditioning criterion of 80 percent or more avoidances on three consecutive days. Extinction was studied during the next 8 days using the same procedure as during avoidance acquistion except that no US was applied.

The total number of positive avoidances scored by each rat during the extinction sessions served as an index for the psychopharmacological activity.

The treatment with the peptides involved was started on the day the animals had reached the conditioning criterium immediately after the last trial of the session. They were injected subcutaneously every other day during the extinction period.

In the following table the results of the shuttle-box test are described.

TABLE

| Substance**) | Average of CAR's*) during the last day of acquisition (total of 10 trials) | Average total number of CAR's during the extinction period of 8 days (total of 80 trials) |
| --- | --- | --- |
| 1. placebo 0.5 ml saline s.c. | 9 | 50 |
| 2. (1-10) ACTH 20 μg s.c. | 9 | 71 |
| 3. 7-D-Phe-(1-10)-ACTH 20 μg s.c. | 9 | 10 |
| 4. 7-D-Phe-(4-10)-ACTH 20 μg s.c. | 9 | 9 |
| 5. 7-D-Phe-8-Lys-(4-9)-ACTH 20 μg s.c. | 9 | 8 |
| 5. 7-D-Phe-(4-9)-ACTH 20 μg s.c. | 9 | 9 |

*) CAR = conditioned avoidance response
**) the peptides were administered as zinc-complexes

DESCRIPTION OF THE PREFERRED EMBODIMENTS

The following remarks are to be made with regard to the examples, elucidating the peptides according to the invention:

A. If no optical configuration is mentioned, the L-form is meant.

B. The following abbreviations for the protecting groups have been used:

| Z | : benzyloxycarbonyl |
| --- | --- |
| BOC | : tertiairbutyloxycarbonyl |
| t-Bu | : tert. butyl |
| Me | : methyl |
| NP | : p-nitrophenyl |
| $N_2H_3$ | : hydrazide |
| T | : trityl |

C. The following abbreviations with regard to the solvents used have been mentioned:

| Bz | : benzene |
| --- | --- |
| EtOH | : ethanol |
| Ac | : acetic acid |
| Py | : pyridine |
| Wa | : water |
| Bu | : butanol |
| d.m.f. | : dimethylformamide |
| Am | : amylalcohol |

D. The following abbreviations with regard to the amino acids have been used:

| Ser | : seryl |
| --- | --- |
| Met | : methionyl |
| Glu | : glutamyl |
| Gln | : glutaminyl |
| His | : histidyl |
| Phe | : phenylalanyl |
| Arg | : arginyl |
| Lys | : lysyl |
| Trp | : tryphotophyl |
| Gly | : glycyl |

E. Other abbreviations used:

| DCCI | : dicyclohexyl carbodiimid |
| --- | --- |
| DCHA | : dicyclohexyl amine. |

PREPARATION STARTING SUBSTANCES

A.1. Synthesis of Boc-Met-Glu(OtBu)—$N_2H_3$

Boc-Met-OH (24.9 gm; 100 mmol), obtained from the dicyclohexylamine salt, was dissolved in 300 ml purified methylene chloride. To this solution 26.75 gm H-Glu(OtBu)-OEt.HCl was added. The mixture obtained was cooled to 0°C, after which 14 ml triethylamine was added. Then the mixture was cooled to −5°C, after which 20.6 gm DCCI was added and the suspension stirred at 0°C for 20 hours. The residue consisting of dicyclohexylurea and triethylamine.HCl was filtered and washed. Then the methylene chloride was washed with 0.1 n hydrogen chloride, water, 5 percent sodium bicarbonate and again with water. After drying over magnesium sulphate, the methylene chloride was evaporated in vacuo and the residue crystallized from ethyl acetate/petroleumether (40/60).

Data: m.p. 95°-98°C; $[\alpha]_D = -18°$ (c = 1 in ethanol); Rf in Bz:EtOH (9:1) = 0.74.

4.6 gm of the dipeptide-ester, obtained above, was dissolved in 25 ml ethanol and the solution cooled down to 0°C. Then 1 ml hydrazine-hydrate was added. The mixture was left to stand for 18 hours at 0°C. Then the precipitate formed was filtered off and crystallized from ethanol (three times). M.p. 213°-216°C (decomposition); $[\alpha]_D = -15°$ ( c = 2 in ethanol).

A.2. Synthesis of Boc-Gly-Met-$N_2H_3$

Six grams H-Met-OMe.HCl (3 mmol) was suspended in 100 ml methylene chloride. After cooling to 0°C a current of dried ammoniagas was bubbled through the suspension for half an hour, while cooling. The suspension was then filtered over hyflo and the filtrate evaporated to dryness in vacuo (bath temperature 40°C). The oil obtained was dissolved in 50 ml ethyl acetate. The resulting solution was cooled to 0°C, after which 8.9 gm Boc-Gly-ONP was added and the mixture obtained was stirred for 3 hours at 0°C. The reaction mixture was evaporated to dryness and the residue washed twice with peroxide-free ether. The mixture was filtered and the residue obtained taken up in 100 ml aqueous ethyl acetate and washed with 0.5 N hydrochloric acid, water, 10 percent sodium bicarbonate and again with water. Then the ethyl acetate was dried and distilled off in vacuo. The crystalline residue was recystallized from methanol/ether/petroleumether.

M.p. 80-83°C; $[\alpha]_D = -7°$ (in methanol); Rf in Bz:EtOH (9:1) = 0.74. Five grams dipeptide-methylester were dissolved in 10 ml methanol, after which 1 ml hydrazine hydrate was added. The solution was stirred at room temperature for 20 hours. Then the light yellow suspension was stirred for 1 hour at 0°C and filtered. The residue was washed three times with peroxide-free ether and then crystallized from methanol.

M.p. 170°-174°C; $[\alpha]_D = -7°$ (c = 1 in d.m.f.); Rf in Bu:Py:Ac:Wa (4:0.75:0.25:1) = 0.62.

A.3. Synthesis of Boc-Ser-Met-$N_2H_3$

Boc-Ser-OH.DCHA (7.72 gm) was dissolved in 50 ml purified methylene chloride. To this solution was added a suspension of 4 gm H-MeT-OMe.HCl in 15 ml methylene chloride. The suspension was stirred for 20 minutes at room temperature and then cooled to 0°C. Then 4.2 gm DCCI was added and the mixture obtained stirred for 4 hours at 0°C and then for 18 hours at room temperature (during this process a little solvent may be added, if required). The said mixture was filtered and the precipitate washed with methylene chloride. The collected methylene chloride filtrates were evaporated to 250 ml, after which 100 ml ether was added to precipitate the dipeptide.

M.p. 68°–69°C; $[\alpha]_D = -30.7°$ (c = 2 in methanol) Rf in Bz:EtOH (8:2) = 0.70.

The dipeptide-ester (2.3 gm) was dissolved in 15 ml methanol, after which 1 ml hydrazine-hydrate was added. The mixture was stirred at room temperature for 18 hours, after which the precipitate obtained was filtered off, washed with cold methanol and recrystalized from methanol/water.

M.p. 189°–191°C; $[\alpha]_D = 13.9°$ (c = 1 in d.m.f.).

A.4. Synthesis of Boc-Ser-Met-Glu(OtBu)-N$_2$H$_3$

Boc-Ser-MeT-N$_2$H$_3$ (1.15 gm; 3.3 mmol) obtained according to A.3. was dissolved in 10 ml purified d.m.f. and cooled to −10°C. To this solution was added 6.6. m.eq. hydrochloric acid in freshly distilled tetrahydrofuran, after which the solution was cooled further to −20°C. Then 0.48 ml isoamyl nitrite was added dropwise and with the solution was stirred vigorously for 5 minutes. The temperature should remain between −20° and −25°C. In the meantime 0.88 gm (3.3 mmol) H-Glu(OtBu)-OEt.HCl was dissolved in 10 ml dimethylformamide. This solution was cooled to 0°, after which 1.4 ml triethylamine was added. The solution was cooled further to −20°C, after which the azide solution was added. The mixture was reacted for 73 hours at 0°C, after which the solvent was evaporated in vacuo at a bath temperature of 40° and the residue was taken up in aqueous ethyl acetate. The ethyl acetate was washed with 0.1 N hydrochloric acid, water, 5 percent sodium bicarbonate and again with water, and dried over sodium sulphate. After filtration the ethyl acetate was evaporated in vacuo and the residue recrystalized from ethyl acetate/petroleumether (40/60).

M.p. 182°–184°C; $[\alpha]_D = -17.4°$ (c = 1 in d.m.f.). Rf in Bz:EtOH (8:2) = 0.70

One gram of the tripeptide-ester was converted into the hydrazide by the process described for Boc-Ser-Met-OMe (A.3.).

M.p. 217°C (dec.); Rf in Bu:Py:Ac:Wa (4:0.75:0.25:1) = 0.58.

A.5. In the same manner as described in A.4. was prepared:

Boc-Gly-Met-Glu(OtBu)-N$_2$H$_3$; $[\alpha]_D = -5.3°$ in d.m.f.; m.p. 187°–190°C (dec.).

A.6. In the same manner as described in A.1. was prepared:

Boc-Met-Glu(NH$_2$)-N$_2$H$_3$, starting from Boc-Met-OH and H-Glu(NH$_2$)-OEt.

B. Synthesis of His-D-Phe-Arg-Trp derivatives

B.1. T(T)-His-D-Phe-Arg-Trp-OMe

Eight grams (10 mmol) ditrityl-His-D-Phe-N$_2$H$_3$ was dissolved in 35 ml purified dimethylformamide. This solution was cooled to −20°C. Then 2 eq. hydrochloric acid in tetrahydrofuran (freshly prepared by bubbling dried hydrochloric acid gas through tetrahydrofuran) was added, after which the solution was again cooled to −20°C. At this temperature 1.48 ml isoamyl nitrite (11 mmol) was added and then the solution was stirred for 5 minutes (during this process the temperature should remain below −20°C). In the meantime a solution of 3.7 gm H-Arg-Trp-OMe-DiHCl (8.3 mmol) was prepared in 20 ml dimethylformamide. This solution was cooled and then 4 ml triethylamine was added. The two solutions were mixed, after which the azide condensation was continued for 72 hours at 0°C. The coloured solution was evaporated to dryness in vacuo, after which the resulting residue was taken up in aqueous ethyl acetate and washed with a little 2 N acetic acid, water, sodium bicarbonate (5percent) and again with water. The mixture was dried over sodiumsulphate, after which the ethyl acetate was evaporated in vacuo. The residue was recrystallized from methanol/ether. M.p. 202°–210°C (dec.); $[\alpha]_D = -39.8°$ (c = 1 in methanol); Rf in Bz:EtOH (8:2) = 0.82.

B.2. T(T)-His-D-Phe-Arg-Tro-NH$_2$ 1 gram of ester B.1. was dissolved in 25 ml of methanol. After cooling to 0°C ammonia was bubbled through. After 4 hours the precipitate was filtered off and recrystallized from methanolether.

Yield: 0.74 grams. Melting point: 182° dec. Rf in Bz:EtOH (8:2) = 0.37 (SiO$_2$).

B.3. T(T)-His-D-Phe-Arg-Trp-N(CH$_3$)$_2$ 1 gram of ester B.1. was dissolved in 25 ml of methanol and after cooling to −20°C dimethylamine was introduced and the resulting mixture allowed to stand for 20 hours. The mixture was then stirred at room temperature for 1 hour additionally. The methanol was evaporated in vacuo and the residue was stirred with ether and dried.

Rf in Bz:EtOH (8:2) = 0.45 (SiO$_2$).

B.4. T(T)-His-D-Phe-Arg-Trp-OH

Of the above-mentioned tetrapeptide B.1. 2.3 gm was dissolved in a mixture of 17.5 ml methanol and 2.5 ml water. At a temperature of 4°C 2.3 ml 4 n sodium hydroxide, also cooled to 4°C, was added. The alkaline solution was stirred for 1 hour at room temperature, cooled again to 4°C, and then added quickly, dropwise, to 100 ml 1 N acetic acid, which had been vigorously stirred and also cooled to 4°C, to precipitate the tetrapeptide acid. The reaction mixture was left to stand for 1 hour at 0° and then filtered.

M.p. 225°–234°C (dec.); $[\alpha]_D = -39.1°$ (c = 1 in methanol); Rf in Bz:EtOH (8:2) = 0.27.

B.5. T(T)-His-D-Phe-Arg-Trp-OC$_{16}$H$_{33}$.

1.13 grams of tetrapeptide derivative B.4. was dissolved in 20 ml of DMF. After adding 0.18 gram of DCHA and 0.3 gram of hexadecylbromide the solution was stirred for 40 hours at 35°C. After cooling at +5°C the precipitate was filtered off and the fitrate evaporated in vacuo.

The residue was taken up in 10 ml of DMF and added to water, while stirring.

The precipitate was filtered off and twice stirred with 25 ml of water.

Yield 0.9 gram. Rf in Bz:EtOH (8:2) = 0.87 (SiO$_2$).

B.6. In the same manner as described in B.5. were prepared:

T(T)-His-D-Phe-Arg-Trp-O-(CH₂)₃-   Rf* : 0.81

T(T)-His-D-Phe-Arg-Trp-O-C₁₁H₂₃   Rf* : 0.86

T(T)-His-D-Phe-Arg-Trp-O-C₁₇H₃₃   Rf* : 0.83

*Rf in Bz:EtOH 8:2 (SiO₂).

B.7. H-His-D-Phe-Arg-Trp-derivatives

The two trityl groups from T(T)-His-D-Phe-Arg-Trp-OMe (B1.) were split off by dissolving the compound in acetic acid (1 mmol substance in 5 ml) and heating this solution on a steam bath for 10 minutes.

The solution was cooled and poured into 100 ml of diethylether. The precipitate was filtered off, dissolved in water and stirred with amberlite IRA 410 in order to remove any acid present. The filtrate was lyophilised.

In the same manner the other derivatives were deprotected.

c. Synthesis of Z-His-D-Phe-Lys(Boc)-Trp-OMe Z-His-D-Phe-N₃ obtained from 10 mmol of the corresponding hydrazide was added to a solution of 8.3 mmol H-Lys(Boc)-Trp-OMe.HCl (b) in 20 ml d.m.f. and 4 ml triethylamine. This mixture was left to stand for 70 hours at 0°C. Then the reaction mixture was evaporated to dryness in vacuo and the resulting oily residue taken up in aqueous ethyl acetate. The solution obtained was washed with 5 percent citric acid, water, 5 percent bicarbonate and again with water (bath temperature 40°C). The organic layer was separated and the solvent evaporated, after which the resulting resi-

| peptide | protected peptide prepared in | Rf* | His : Phe : Arg | NH₃ |
|---|---|---|---|---|
| H-His-D-Phe-Arg-Trp-OMe | B.1. | 0.34 | | |
| H-His-D-Phe-Arg-Trp-NH₂ | B.2. | 0.29 | 0.95 : 0.99 : 1.02 | 0.99 |
| H-His-D-Phe-Arg-Trp-N(CH₃)₂ | B.3. | 0.29 | | |
| H-His-D-Phe-Arg-Trp-O-C₁₆H₃₃ | B.5. | 0.32 | 0.97 : 0.95 : 1.01 | |
| H-His-D-Phe-Arg-Trp-O-(CH₂)₃-⌬ | B.6. | 0.30 | | |
| H-His-D-Phe-Arg-Trp-O-C₁₁H₂₃ | B.6. | 0.32 | | |
| H-His-D-Phe-Arg-Trp-O-C₁₇H₃₃ | B.6. | 0.31 | | |
| H-His-D-Phe-Arg-Trp-OH | B.4. | 0.25 | 1.00 : 0.95 : 1.03 | |

Rf* in Bu:Py:Ac:Wa (4:3/4:1/4:1) on SiO₂.

C. Synthesis of His-D-Phe-Lys(BOC)-Trp derivatives

C.1. Synthesis of Z-His-D-Phe-Lys(Boc)-Trp-OMe
a. In 150 ml methylene chloride 11.6 gm (46 mmol) H-Trp-OMe.HCl was suspended. The suspension was cooled to 0°C, after which ammonia gas was bubbled through the suspension for half an hour. After filtration over hyflow the filtrate was evaporated to dryness in vacuo (bath temperature 40°C) and the residue taken up in 150 ml methylene chloride in which 17.6 gm Z-(Boc)-Lys-OH had been dissolved. The mixture was cooled to 0°C, after which 9.5 gm dicyclohexyl carbodiimide was added and the reaction mixture stirred for 65 hours at 0°C. Then 150 ml ethyl acetate was added, after which the mixture was filtered and the filtrate was washed with 0.1 N hydrochloric acid, water, 5 percent sodium bicarbonate and again with water. The organic layer was evaporated to dryness and the residue was recrystallized from boiling benzene. Melting point of Z-Lys(Boc)-Trp-OMe is 114°-122°C; $[\alpha]_D = -30°$ (c = 1 in methanol); Rf in Bz:EtOH (8:2) = 0.83.

b. By hydrogenation with palladium on carbon (10 percent) in methanol in the presence of 1 eq. hydrochloric acid, the dipeptide ester H-Lys(Boc)-Trp-OMe was obtained as a hydrochloride. Rf in Am:Py:Wa (5:3:2) = 0.71.

due was crystallized from ethyl acetate/petroleumether (40/60).

Melting point of Z-His-D-Phe-Lys(Boc)-Trp-OMe = 185°-190°C; $[\alpha]_D = -14°$ (c = 1 in methanol; Rf in Bz:EtOH (9:1) = 0.70.

C.2. Z-His-D-Phe-Lys(BOC)-Trp-NH₂
Starting from 1 gram of the ester prepared in C.1.c the amide was obtained in the same manner as described for the arginine compound B.2.
Yield: 74 percent. Rf in Bz:EtOH (8:2) = 0.27 (SiO₂).

C.3. Z-His-D-Phe-Lys(BOC)-Trp-NH(CH₃)
Starting from 1 gram of the ester prepared in C.1.c the monomethyl amide was obtained in the same manner as described in B.3. on the understanding that methylamine instead of dimethylamine has been used.
Yield: 70%; Rf in Bz:EtOH (8:2) = 0.29 (SiO₂).

C.4. Z-His-D-Phe-Lys(Boc)-Trp-OH
4.9 gram of the ester prepared in example C.1.c was dissolved in 25 ml of methanol and 1 eq. of sodium hydroxide. After 1 hour the solution was poured into 250 ml of 0.5 N acetic acid, after which the methanol was evaporated. The pH was then adjusted to 6.3 and water evaporated in vacuo. The precipitate formed was crystallized from ethanol.

yield: 3.7 gram; metling point 173° (dec.); Rf in Bz:E-tOH (8:2) = 0.07 (SiO₂).

C.5. Z-His-D-Phe-Lys(Boc)-Trp-OC₅H₁₁ a. To 5.7 grams of Z-Lys(Boc)-Trp-OH (Rf = 0.13 in Bz:EtOH (8:2)) was added 60 ml of DMF, 1.8 grams of DCHA and 10 mmol of pentylbromide. After stirring for 40 hours at 30°C the precipitate was filtered off and the filtrate poured into 600 ml of water, precooled at 0°C. After stirring for 2 hours the precipitate was filtered off again, dissolved in ethylacetate after which this solution was washed with 5 percent sodium bicarbonate and water. The ethylacetate layer was then dried, after which the solvent was evaporated in vacuo, yielding an oil.

Rf in Bz:EtOH (9:1) = 0.74 (SiO₂).

In the same manner the n-phenylbutylester (Rf 0.72) and the octadecyl ester (Rf 0.74) are prepared.

b. Hydrogenation as described in example C.1.b, yielded the Hcl salt of esters of H-Lys(Boc)-Trp-OR.

| R | Rf in Am:Py:Wa (5:3:2) op SiO₂ |
|---|---|
| C₅H₁₁ | 0.43 |
| (CH₂)₄-⌬ | 0.40 |
| C₁₈H₃₇ | 0.44 | c. Starting from 10 mmol Z-His-D-Phe-N₂H₃ the corresponding azide was prepared as described before.

The azide solution was diluted to a volume of 50 ml with DMF. 10 ml Azide solution was added to a solution of 2 mmol H-Lys(Boc)-Trp-OR (C.5. b) in 10 ml of DMF, precooled to −10°C. After adding TAA (resulting pH 6.9–7.1) the mixture was stirred at 0°C for 70 hours.

The reaction mixture was further treated in accordance with example C.1.c.

| peptide ester | Rf in Bz:EtOH (8:2) SiO₂ |
|---|---|
| Z-His-D-Phe-Lys(Boc)-Trp-OC₅H₁₁ | 0.82 |
| Z-His-D-Phe-Lys(Boc)-Trp-O(CH₂)₄-⌬ | 0.80 |
| Z-His-D-Phe-Lys(Boc)-Trp-OC₁₈H₃₇ | 0.85 |

C.6. H-His-D-Phe-Lys(Boc)-Trp-derivatives

Hydrogenation of the peptide-derivatives obtained in C.1.–C.5. in the presence of 10 percent palladium on charcoal in methanol yielded the following tetrapeptide-derivatives.

| peptide | protected peptide obtained in | Rf in Bu:Py:Ac:Wa (4:3/4:1/4:1) |
|---|---|---|
| 1. H-His-D-Phe-Lys(Boc)-Trp-OMe | C.1.c | 0.36 |
| 2. H-His-D-Phe-Lys(Boc)-Trp-NH₂ | C.2. | 0.32 |
| 3. H-His-D-Phe-Lys(Boc)-Trp-NH(CH₃) | C.3. | 0.32 |
| 4. H-His-D-Phe-Lys(Boc)-Trp-OH | C.4. | 0.27 |
| 5. H-His-D-Phe-Lys(Boc)-Trp-OC₅H₁₁ | C.5.c | 0.35 |
| 6. H-His-D-Phe-Lys(Boc)-Trp-O(CH₂)₄-⌬ | C.5.c | 0.33 |
| 7. H-His-D-Phe-Lys(Boc)-Trp-OC₁₈H₃₇ | C.5.c | 0.37 |

EXAMPLE I

H-Met-Glu-His-D-Phe-Arg-Trp-OH

1. Boc-Met-Glu(OtBu)-His-D-phe-Arg-Trp-OH 1.97 (4 mmol) gram Boc-Met-Glu(OtBu)-N₂H₃ (A.1.) was dissolved in 10 ml DMF. The solution was cooled to 0°C and then 8 m.eq. freshly prepared HCl/THF was added. The solution obtained was cooled further to −20°C. after which 0.6 ml (4.4 mmol) isoamylnitrite was added to prepare the azide. The solution was stirred for 5 minutes and added to a solution of 2.57 gram of H-His-D-Phe-Arg-Trp-OH (B.7.) and 1.68 ml of TAA. The reaction mixture was left to stand for 96 hours at 0°C, after which the pink coloured solution was poured into aqueous acetic acid (pH = 5). The precipitate formed was filtered and dried. Rf in Bu:-Py:Ac:Wa (4:3/4:1/4:1) = 0.65 (SiO₂).

2. H-Met-Glu-His-D-Phe-Arg-Trp-OH

The hexapeptide obtained above was treated with trifluoroacetic acid (100 mg in 2 ml of TFA 90 percent). The solution was left to stand for half an hour and then evaporated to dryness in vacuo (bath temperature 25°C). The residue was dried over solid potassium-hydroxide. The resulting foamy residue is dissolved in water-tertiary butanol (1:1) and treated, in batches, with Dowex (acetate form) during which process the trifluoro acetic acid was exchanged for acetic acid. The resulting aqueous solution is lyophilised. Rf in Bu:-Py:Ac:Wa (4:3/4:1/4:1) = 0.24 op SiO₂.

EXAMPLE II

Synthesis H-Met-Glu-His-D-Phe-Arg-Trp-R

1. Boc-MET-Glu(OtBu)-His-D-Phe-Arg-Trp-NH₂ 0.99 grams of Boc-Met-Glu(OtBu)-N₂H₃ (ex. A.1) is converted in the azide in the same manner as described in ex. I.1. The azide solution is added to a solution of 2 mmoles of H-HIs-D-Phe-Arg-Trp-NH₂ (B.7.) in 10 ml of DMF after which TAA is added (pH 6.9). The reaction mixture is stirred for 70 hours at 0°C and then further treated as described in I.1.

Yield: 0.75 grams. Rf in Bu:Py:Ac:Wa (4.3/4:1/4:1) = 0.74 SiO₂.

2. H-Met-Glu-His-D-Phe-Arg-Trp-NH₂

In the same manner as described in I.2. the protected peptide was deprotected.

Yield: 71%. Rf in Bu:Py:Ac:Wa (4:3/4:/1/4:1) = 0.26 (SiO₂).

3. In the same manner were prepared from A.1. and b.7.:

EXAMPLE IV

H-Gly-MET-Glu-His-D-Phe-Arg-Trp-OC₁₆H₃₃ In the same manner described in ex. III Boc-Gly-Met-Glu(OtBu)-N₃ (prepared from the hydrazide A.5.) and H-His-D-Phe-Arg-Trp-OC₁₆H₃₃ (B.7.) were coupled, yielding Boc-Gly-Met-Glu(OtBu)-His-D-Phe-Arg-Trp-OC₁₆H₃₃ (64 percent). Splitting off the protecting groups as described in ex. I.2. yields the acetate of the heptapeptide: H-Gly-Met-Glu-His-D-Phe-Arg-Trp-OC₁₆H₃₃. Rf in Bu:Py:Ac:Wa (4:3/4:1/4:1) = 0.29 (SiO₂). In the same manner is prepared (from A.5. + B.7.): H-Gly-Met-Glu-His-D-Phe-Arg-Trp-OH. Rf in Bu:Py:Ac:Wa (4:3/4:1/4:1) = 0.23 (SiO₂).

|  | Rf* | Met | Glu | His | Phe | Arg |
|---|---|---|---|---|---|---|
| H-Met-Glu-His-D-Phe-Arg-Trp-OMe | 0.30 | 1.00 | 0.97 | 0.97 | 0.96 | 1.01 |
| H-Met-Glu-His-D-Phe-Arg-Trp-OC₁₆H₃₃ | 0.31 | - | - | - | - | - |
| H-Met-Glu-His-D-Phe-Arg-Trp-O(CH₂)₃-C₆H₅ | 0.31 | - | - | - | - | - |
| H-Met-Glu-His-D-Phe-Arg-Trp-OC₁₁H₂₃ | 0.29 | 1.00 | 0.99 | 0.97 | 0.95 | 1.03 |
| H-Met-Glu-His-D-Phe-Arg-Trp-OC₁₆H₃₃ | 0.30 | - | - | - | - | - |
| H-Met-Glu-His-D-Phe-Arg-Trp-N(CH₃)₂ | 0.26 | 1.00 | 0.97 | 0.96 | 0.98 | 1.01 |

Rf* Bu:Py:Ac:Wa (4:3/4:1/4:1) (SiO₂).

EXAMPLE III

Synthesis H-Ser-Met-Glu-His-D-Phe-Arg-Trp-R

1. Boc-Ser-Met-Glu(OtBu)-His-D-Phe-Arg-Trp-OMe

Condensating the azide Boc-Ser-Met-Glu(OtBu)-N₃ (prepared from the hydrazide A.4. with H-His-D-Phe-Arg-Trp-OMe (B.7.) the Boc-heptapeptide-ester was prepared.

The latter peptide was obtained by pouring the reaction mixture into water containing acetic acid (pH 6.7) and washing the precipitate with DMF/water (1:9). Further purification was carried out by washing the precipitate with methanol/water (1:1).

Yield: 1.1 gram. Melting point: 212° dec. Rf in Bu:Py:Ac:Wa (4:3/4:1/4:1) = 0.76 (SiO₂).

2. H-Ser-Met-Glu-His-D-Phe-Arg-Trp-OMe 250 mg of the substance prepared in III.1. was dissolved in 10 ml of 90% TFA. After 1 hour the heptapeptide was isolated and converted into the acetate, as described in Example I.2.

Yield: 130 mg. Rf in Bu:Py:Ac:Wa (4:3/4:1/4:1) = 0.31 (SiO₂).

3. In the same manner were prepared

EXAMPLE V

Synthesis of H-Met-Glu-His-D-Phe-Lys-Trp-OMe

1. Boc-Met-Glu(OtBu)-His-D-Phe-Lys(Boc)-Trp-OMe 4.4 mmol of the azide Boc-Met-Glu(OtBu)-N₃ prepared in Example I.1. was added to a solution, of 2.92 gm H-His-D-Phe-Lys(Boc)-Trp-OMe (C.6.1) in 12 ml DMF and 1.68 ml triethylamine. After the reaction mixture was left stand for 65 hours, the reaction mixture was evaporated to a syrup and this syrup dissolved in a ethylacetate/water mixture (9:1). The solution was washed with 5 percent citriic acid solution. water, NaHCO₃-solution and again with water. Then the organic layer was evaporated in vacuo. The protected hexapeptide-ester was further dried. M.p. 137°–141°C; Rf in Bz:EtOH (8:2) = 0.75.

2. H-Met-Glu-His-D-Phe-Lys-Trp-OMe The hexapeptide ester obtained above was treated with trifluoroacetic acid, after which the trifluoro acetic groups were exchanged for acetic acid groups in a manner described before. Rf in Bu:Py:Ac:Wa (4:0.75:0.25:1) = 0.42.

In the same manner as described in V.1. and V.2. the following peptide-derivatives were prepared:

|  | starting products | Rf*) |
|---|---|---|
| H-Ser-Met-Glu-His-D-Phe-Arg-Trp-OC₁₁H₂₃ | A.4. + B.7. | 0.32 |
| H-Ser-Met-Glu-His-D-Phe-Arg-Trp-NH₂ | A.4. + B.7. | 0.26 |
| H-Ser-Met-Glu-His-D-Phe-Arg-Trp-OH | A.4. + B.7. | 0.19 |

*) Rf in Bu:Py:Ac:Wa (4:3/4:1/4:1) on SiO₂.

| | | Rf* | starting products |
|---|---|---|---|
| 3. | H-Met-Gln-His-D-Phe-Lys-Trp-OMe | 0.32 | A.6. and C.6.1. |
| 4. | H-Ser-Met-Glu-His-D-Phe-Lys-Trp-OMe | 0.39 | A.4. and C.6.1. |
| 5. | H-Gly-Met-Glu-His-D-Phe-Lys-Trp-OMe | 0.42 | A.5. and C.6.1. |
| 6. | H-Met-Glu-His-D-Phe-Lys-Trp-$NH_2$ | 0.34 | A.1. and C.6.2. |
| 7. | H-Met-Glu-His-D-Phe-Lys-Trp-$NHCH_3$ | 0.35 | A.1. and C.6.3. |
| 8. | H-Met-Glu-His-D-Phe-Lys-Trp-$OC_5H_{11}$ | 0.44 | A.1. and C.6.5. |
| 9. | H-Met-Glu-His-D-Phe-Lys-Trp-O-$(CH_2)_4$-⟨⟩ | 0.41 | A.1. and C.6.6. |
| 10. | H-Met-Glu-His-D-Phe-Lys-Trp-$OC_{18}H_{37}$ | 0.43 | A.1. and C.6.7. |
| 11. | H-Met-Glu-His-D-Phe-Lys-Trp-OH | 0.3? | A.1. and C.6.4. |

*) Rf in Bu:Py:Ac:Wa (2:3/4:1/4:1) on $SiO_2$.

EXAMPLE VI

A solution of the hexapeptide H-Met-Glu-His-D-Phe-Arg-Trp-OH, mentioned in Example I, 10 mg/ml, zinc 8.33 mg/ml and $Na_2HPO_4$ 2 aq. 3.5 mg/ml was adjusted to pH 2 with 1 N HCl. Zinc was added as zinc chloride. Fifteen ml of this solution and 0.5 M sodium hydroxide (in order to obtain a pH of 8 in the resulting suspension) were added simultaneously, while stirring, to 25 ml of a mixture of the following composition:

| benzylalcohol | 20 mg/ml |
|---|---|
| NaCl | 4 mg/ml. |

The volume of the suspension was completed with distilled water to 50 ml. The final composition of the suspension was:

| benzylalcohol | 10 | mg/ml |
|---|---|---|
| NaCl | 6.8 | mg/ml |
| hexapeptide | 3 | mg/ml |
| zinc | 2.5 | mg/ml |
| $PO_4$ | 0.56 | mg/ml. |

What is claimed is:

1. A peptide of the formula:

X-L-MET-A-L-His-D-Phe-B-L-Trp-OH, in which X is selected from the group consisting of hydrogen, H-L-Ser and H-Gly, A is selected from the group consisting of L-Glu and L-Gln and B is selected from the group consisting of L-Arg and L-Lys, and a derivative thereof selected from the group consisting of a pharmaceutically acceptable acid addition salt, a C-terminal unsubstituted amide, an alkyl-substituted amide, the alkyl group of which contains 1–6 carbon atoms, a C-terminal ester derived from an aliphatic or phenylaliphatic alcohol with 1–18 carbon atoms, and a complex of a metal selected from the group consisting of zinc, copper, nickel, cobalt and iron.

2. A metal complex according to claim 1, consisting of peptide of the formula of claim 1, and a sparingly soluble metal compound selected from the group consisting of a metal salt, a metal hydroxide and a metal oxide, the metal of which is selected from the group consisting of zinc, copper, cobalt, nickel and iron.

3. A complex, as claimed in claim 2, wherein the sparingly soluble metal compound is a member of the group consisting of zinc-hydroxide, zinc-phosphate, zinc-pyrophosphate and zinc-polyphosphate.

4. A peptide of the formula:

H-L-Met-L-Glu-His-D-Phe-L-Lys-L-Trp-OH, and a derivative thereof selected from the group consisting of a pharmaceutically acceptable acid addition salt, a C-terminal unsubstituted amide, an alkyl-substituted amide, the alkyl group of which contains 1–6 carbon atoms, a C-terminal ester derived from an aliphatic or phenylaliphatic alcohol with 1  18 carbon atoms, and a complex of a metal selected from the group consisting of zinc, copper, nickel, cobalt and iron.

* * * * *